K. ITO.
PROPELLER BLADE MILLING MACHINE.
APPLICATION FILED FEB. 14, 1912.

1,077,279.

Patented Nov. 4, 1913.

K. ITO.
PROPELLER BLADE MILLING MACHINE.
APPLICATION FILED FEB. 14, 1912.

1,077,279.

Patented Nov. 4, 1913.

K. ITO.
PROPELLER BLADE MILLING MACHINE.
APPLICATION FILED FEB. 14, 1912.

1,077,279.

Patented Nov. 4, 1913.

UNITED STATES PATENT OFFICE.

KUMEZO ITO, OF FUKUOKA-KEN, JAPAN.

PROPELLER-BLADE-MILLING MACHINE.

1,077,279.  Specification of Letters Patent.  Patented Nov. 4, 1913.

Application filed February 14, 1912. Serial No. 677,531.

*To all whom it may concern:*

Be it known that I, KUMEZO ITO, a subject of the Emperor of Japan, residing at No. 695 Oaza, Noshima, Akizuki-cho, Asakura-gun, Fukuoka-Ken, Empire of Japan, have invented a new and useful Improvement in Propeller-Blade-Milling Machines, of which the following is a specification.

This invention relates to new and useful improvements in propeller blade milling machines, and concerns more especially that type of machine for milling the working faces of the screw propellers for steam vessels.

The machine may either be used for finishing the blades of the screw propeller or for preparing wooden patterns used in the casting of the same, and has for its object to effect the desired contour of the propeller blade in the most economical manner.

In ordinary foundry work, owing to unequal contraction, or from other causes, it is found that the castings taken out from the molds are more or less deformed no matter how perfectly the patterns are prepared. Therefore, propellers made at the foundry are considered as not perfectly true, but must be milled and otherwise acted upon in order to render them efficient as desired.

To this end, my invention consists of providing means which is capable of oscillating and reciprocating a tool carrier about a common axis, and means for guiding said tool carrier in a predetermined path of movement about said axis, to attain the desired contour of the blade, the cutters carried by said tool carrier being adjustable.

In the drawings, forming a part of this specification.

Similar characters refer to similar parts throughout the several views.

The numeral 1 designates a base or foundation of my improved machine, upon which is mounted a suitable rotatable plate 2. A hollow column 3 is carried by said rotatable plate 2 and is provided with threads 3' near its central portion, adapted to receive a nut 4, the lower end of said column 3 being threaded into said plate 2, as shown in the drawing, or otherwise secured thereto. The propeller blade to be operated upon is secured in operative relation to the mechanism carried by said column, by screwing said nut 4 tight upon the hub of the propeller blade, which encircles the column 3. Around the said column, and carried thereby, at its upper portion, a rotatable sleeve 5 is provided, the lower end of which extends in close proximity to the threaded portion 3' of the column. Guided by said sleeve 5 is a hub H from which projects a horizontally disposed beam 6, the hub having a suitable keyway 5" therein adapted to engage with a vertically extending key 5' carried longitudinally of said sleeve 5, in order that the sleeve and hub, together with the parts carried thereby, may rotate in unison, but the latter is movable longitudinally of the former.

From the hub H projects radially a plurality of arms 6', in number according to the number of blades of the propeller to be operated upon, and in the example disclosed, three of such arms are provided, one of which is diametrically opposite the beam 6 with respect to the hub H. The arms 6' are each provided with a way *w* constructed similar to that in an ordinary screw cutting lathe, through which way dependingly extends a suitable cutter holder 7. By means of a rack *r* and pinion *p*, on each arm, these cutter holders may be moved longitudinally along the arms in either direction, similarly as in the slide rest of an ordinary screw cutting lathe. Provided at the end of said cutter holder 7 is a suitable bearing block 10, carrying a horizontally disposed cutter spindle 9. It is desirable to finish all blades at the same time by the working spindles of the several blocks simultaneously, however, owing to the varying surfaces of the castings, these spindles must be capable of adjustment at different angles, or planes, so as to suit the respective cutter A, carried thereby, for the varying contour of the surface of the propeller blades they are to operate upon.

Figure 5:
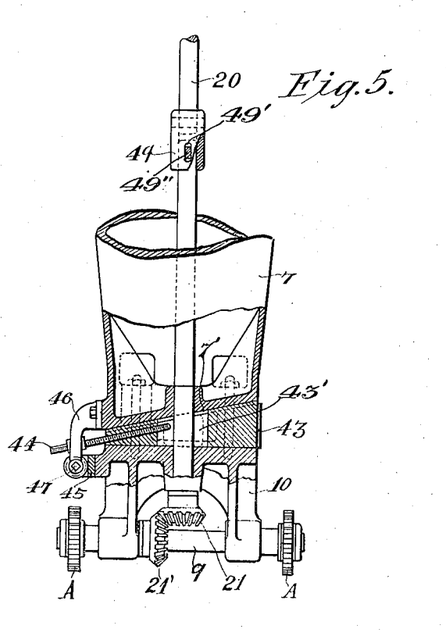
Fig. 5 is a detailed view in front elevation, of the cutter holder, and adjacent elements of the machine, parts being sectioned.
Figure 6:
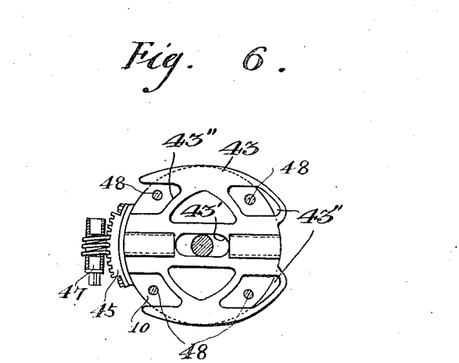
Fig. 6 is a plan view of the cutter holder and associated parts shown in section.
Figure 7:
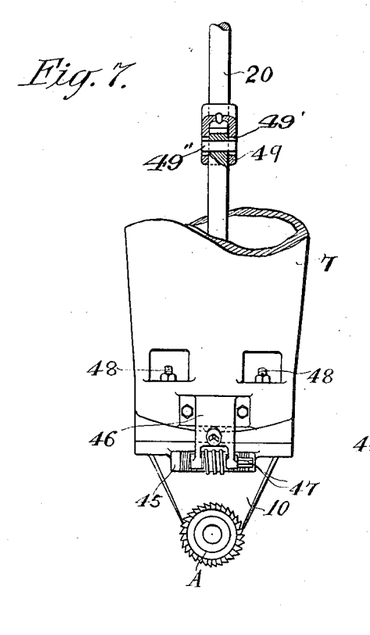
Fig. 7 is a side elevation of the mechanism disclosed in Fig. 5.
Figure 8:
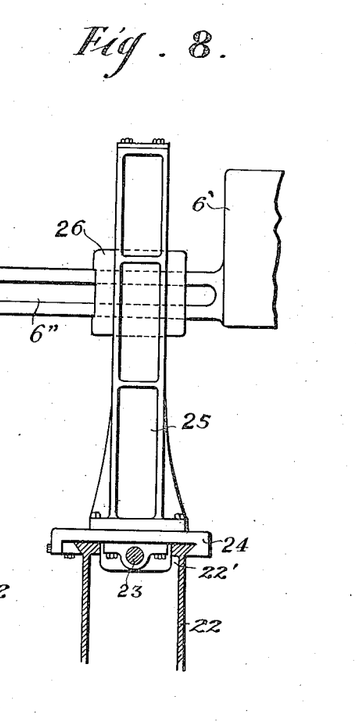
Fig. 8 is a side elevation of mechanism for imparting movement to elements carrying the tool carriers.
Figure 9:
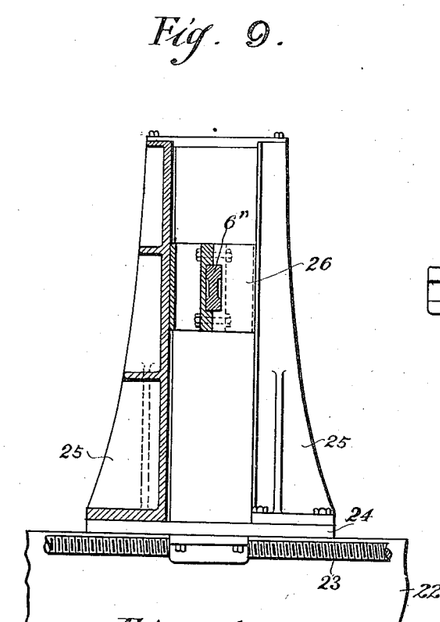
Fig. 9 is a front elevation of the mechanism disclosed in Fig. 8, parts being sectioned to disclose details of construction.
Figure 10:
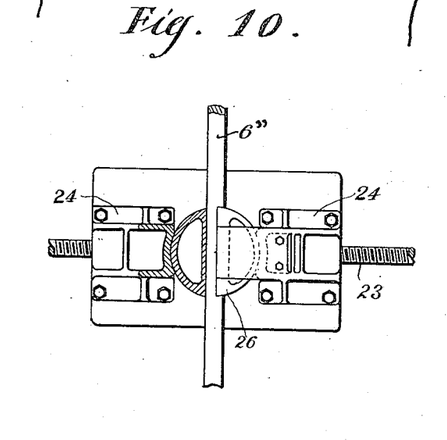
Fig. 10 is a part plan and part sectional view of the mechanism disclosed in Fig. 9.

In order to alter the position of the axis of the spindle 9 in a vertical plane, the end portion of the respective cutter holder it is carried by, is sloped, as at 7', so as to provide a wedge shaped space between such end and the bearing block 10. An adjusting member 43, in the form of a wedge, as shown in Figs. 5, 6 and 7 of the drawings, is interposed between the cutter holder 7 and the block 10, and by means of an adjustable screw 44, the member 43 is caused to move to and fro for elevating or depressing the tools. It is to be noted that the path of movement of the block 10, responsive to actuation of member 43, is in a line parallel to the axis of column 3. The member 43 is provided with a suitable aperture 43', preferably elongated in form, so as to permit passage of a shaft 20 therethrough, which shaft transmits motion to the spindle 9, and does not interfere with the free movement of said member 43.

In ordinary workings, as the cutter traverses the blade, it leaves very slight traces of tool marks upon the faces of the blades to the extent of, say 5/1000 of an inch. The use of bevel cutters may remedy this defect, however, the necessity of the angular adjustment of the cutters for conforming with the varying surface of the piece being milled makes necessary the frequent replacement of the cutting tools, which is undesirable from an economical standpoint. Arrangement is therefore made, by means of my invention, whereby the bearing block 10 is capable of being adjusted so as to avoid this undesirable feature. To this end, a quadrant 45, fixed on one side of the bearing block 10, is in engagement with a suitable worm 47 disposed horizontally upon the arm 46, extending from holder 7, in close proximity to the bearing block 10. With this arrangement, it will be readily seen that the desired angular motion will be imparted to the bearing block 10, by actuating said worm and quadrant, after loosening studs 48, which join bearing block 10 with the cutter holder 7, and which studs are accommodated by apertures 43' in the member 43. Means by which said cutter A may be operated include a main shaft 11, one end of which extends into the base 11 and carries a bevel wheel 12, to gear with a bevel wheel 12' keyed at the lower end of a vertically disposed shaft 13. Said shaft 13, which passes upwardly through the column 3, concentric thereto, and extends above the upper plate 50 of the sleeve 5, has at its upper end a spur wheel 14 to gear with a plurality of toothed wheels 15 keyed on the upper ends of a plurality of depending shafts 16 disposed with their axes parallel to the axis of the sleeve 5. A shaft 16 is provided for each arm 6', preferably disposed to intersect the longitudinal axis of its respective arm, and each shaft has a keyway 16', or its equivalent, adapted to impart movement to a bevel wheel 17, movable with hub H. Above the bed of each arm 6', is disposed a horizontal shaft 18, each provided with a suitable bevel wheel 17', meshing with gear 17 to impart movement thereof to shaft 18. The cutter holder carries a bevel gear 19, keyed in any suitable manner to be circumferentially movable with shaft 18, but slidable longitudinally thereon, while shaft 20 carries a bevel gear 19' meshing with gear 19. Said bevel wheel 19, through gear 19' and shaft 20, causes the cutter spindle 9, upon which the two milling cutters A are mounted, to rotate through the bevel gears 21 and 21', carried by the shaft 20 and spindle 9, respectively. After a cut has been made the distance of the cutters A from the axis of the work is regulated by turning the shaft carrying the pinion P engaging the rack *r* and mounted on the cutter holder 7, thereby moving the cutter holder 7 and its coacting parts along the way *w*. The shaft 9 is suitably arranged to carry two cutters A, so that in milling a surface, the elements of which are at right angles to the axis of the machine, both cutters may be used while in milling a surface of such contour that it is impossible to use two cutters, one may be used.

In adjusting the height of the cutter, it is necessary for the center shaft 20 to have its length adjusted likewise. For this reason, the shaft is divided transversely into two parts, with a suitable coupler 49 connecting such parts. The coupler is preferably provided with an elongated aperture 49' to admit therein a suitable stud or pin 49" which is secured on the end of one of the shaft pieces, while the other shaft piece rigidly carries the coupler 49, as shown in Fig. 5 of the drawing.

Referring more particularly to Figs. 1, 2, 8, 9 and 10, of the drawings, a bed 22, which may be made the same as the bed of an ordinary screw cutting lathe, has a suitable way 22' and a guide screw 23 therein. This bed is adapted to carry thereon a slide-rest 24 also of substantially the form as those used in an ordinary screw cutting lathe. Extending upwardly from and carried by said slide rest 24 are two guide arms 25, spaced apart from each other, the inner faces of which are formed concave longitudinally at arcs described from a common center, to receive therein a drum like slide head 26. Said spaces are so formed as to enable the slide heads not only to oscillate freely but to reciprocate up and down between the guide arms. A lever 6" which extends diametrically through said slide head 26 is rigidly secured at its one end to the arm 6' diametrically opposite beam 6. By applying power through a train of variable speed gears or in any other suitable manner, rotary motion is communicated to the guide screw 23, the effect of which will be to slide the rest 24 upon bed 22, carrying with it the arms 25, and thus cause the bed arm 6' to impart circumferential movement to the hub H, the center of which is concentric to the axis of the sleeve 5.

Legs 28 and 28' diametrically opposite and depending from the beam 6, and the arm 6', respectively, are so disposed that their ends during rotative movement, of the arm 6' and the beam 6, ride upon the surface of the cam tracks 29. The contours of the surfaces of the cam tracks 29 are such that the legs 28 and 28' are caused to move vertically in their course of movement, thereby longitudinally moving the arm 6' and the beam 6 as well as the hub H connected thereto and thereby causing the hub H to move longitudinally as well as rotatively with respect to the sleeve 5. The extent and speed of vertical movement of the hub H may be varied by supplying cam tracks of different surface contours according to the shape of the work to be milled, as the arms 6', carrying the cutter arms 7, are guided in their vertical movement by the contours of the cam tracks.

Figure 11:
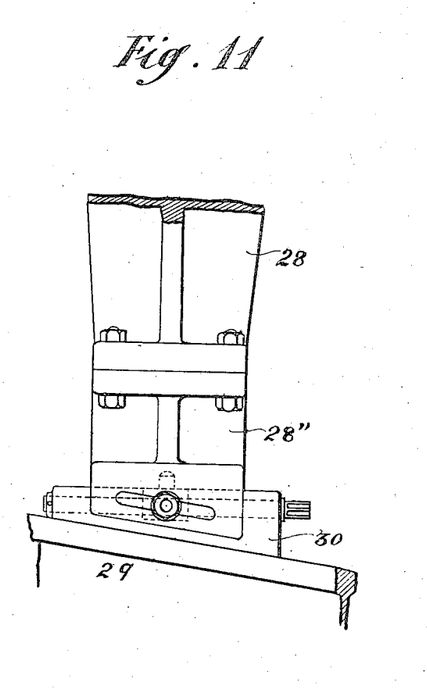
Fig. 11 is a transverse, sectional view through a stationary cam track, together with mechanism riding thereupon.
Figure 12:
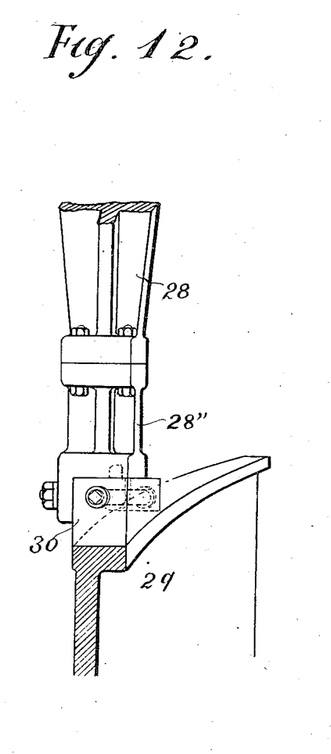
Fig. 12 is a side elevation of the same.

In milling screw propellers it becomes necessary to vary the height of the cutters according to the contour of the surface to be milled; means are therefore provided for adjusting the cutters according to the positions they traverse upon the face of the propeller blades and include suitable holders 28" bolted onto and depending from the underside of each of the legs 28 and 28', each carrying a slidable shoe 30 preferably in the shape of a wedge; as shown in Figs. 11 and 12 of the drawing. As these shoes are placed in contact with the tread of cam tracks 29; it will be obvious that, from the aforesaid arrangement, the height of the legs 28 and 28' may be readily adjusted by moving said shoe with respect to the holders 28" which in turn adjusts the height of the cutters simultaneously. The cam tracks 29, which serve as a pattern, have their treads finished to the shape of the desired pitch screw, the convolution of which is to be copied on the propeller blade resting on the column 3. As the depressing movement of the legs is directed by the cam tracks, it is obvious that the blades to be operated upon will be finished to the contour developed from the pitch of the cam tracks. Thus, by bringing the arms to their original position and operating the cutters repeatedly in the aforesaid manner, the desired milling will be attained.

Arrangement is conveniently made whereby the arms are brought to their original position, and to this end, a suitable bracket 31 is mounted on the sleeve 5, a screw shaft 32, vertically disposed, extending through this bracket, has a toothed wheel 33 at its upper end where the said shaft 32 is supported by the plate 50.

Figure 1:
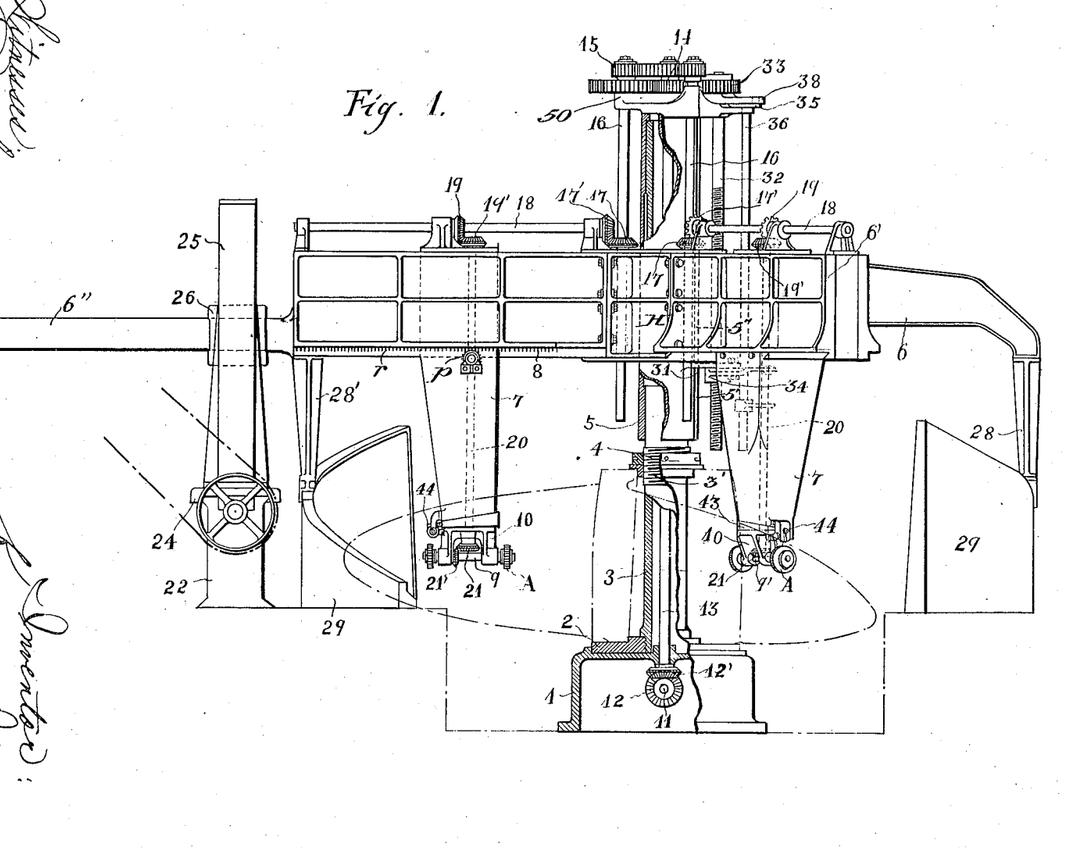
Figure 1 is an elevation of a machine constructed according to my invention, parts being sectioned to disclose details of construction.
Figure 2:
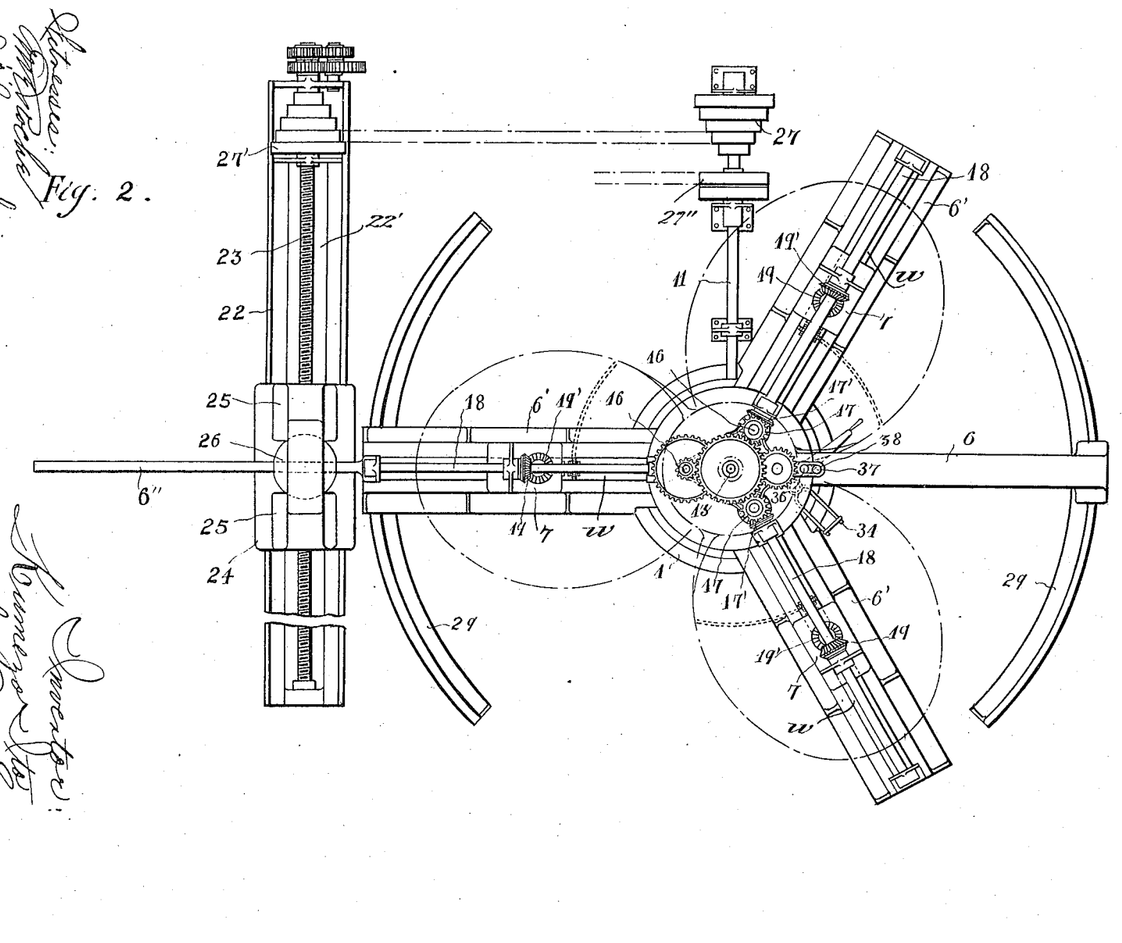
Fig. 2 is a plan view of the machine.
Figure 3:
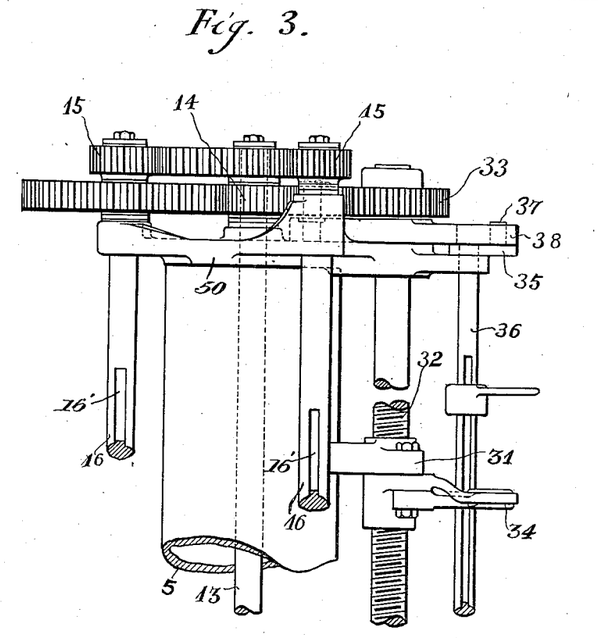
Fig. 3 is a fragmentary, detailed front elevation of mechanism for reciprocating certain of the elements of the machine.
Figure 4:
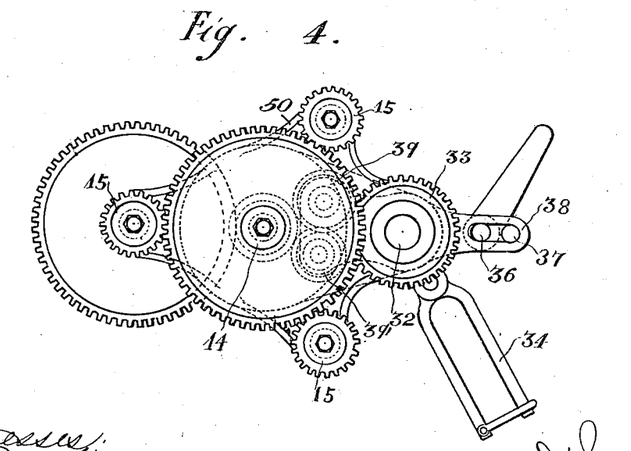
Fig. 4 is a plan view of the mechanism disclosed in Fig. 3.

34 is a two part forked clamping member, one part of which is rigidly secured on the bracket 31, while the other part is unfastened, and is allowed to be thrown in and out of mesh with the screw shaft 32. Vertical reciprocating motion, is therefore communicated to the arms upon working said shaft 32 to the desired direction. Convenient means to cause the said screw shaft 32 to be turned and reversed may consist of a suitable cam or slotted arm 38 movably mounted upon the plate 50. A set pin 37 which extends from the upper face of a lower cam 35 serves to transmit a lateral motion to the said slotted arm 38, through a vertical spindle 36, to the top end of which said lower cam 35 is secured. The two toothed wheels 39 and 39' are supported by said slotted arm 38 and motion will be transmitted onto the toothed wheel 33 either by means of toothed wheels 39 and 14 or through the toothed wheels 39 and 39', according to the direction in which the said slotted arm 38 is moved, as shown in Figs. 3 and 4.

The shaft 11 is driven by means of a reversible prime mover, belted to the double pulley 27" which affords the machine both a direct and reverse drive. In order to bring the rest 24 back into its original position, the prime mover is reversed. This reverses the direction of rotation of the shaft 11 and pulley 27 by which the shaft 23 is driven, by the belt connecting 27' with 27. The rotation of the shaft 23 then causes the rest 24 to move back to its original position.

Figure 13:
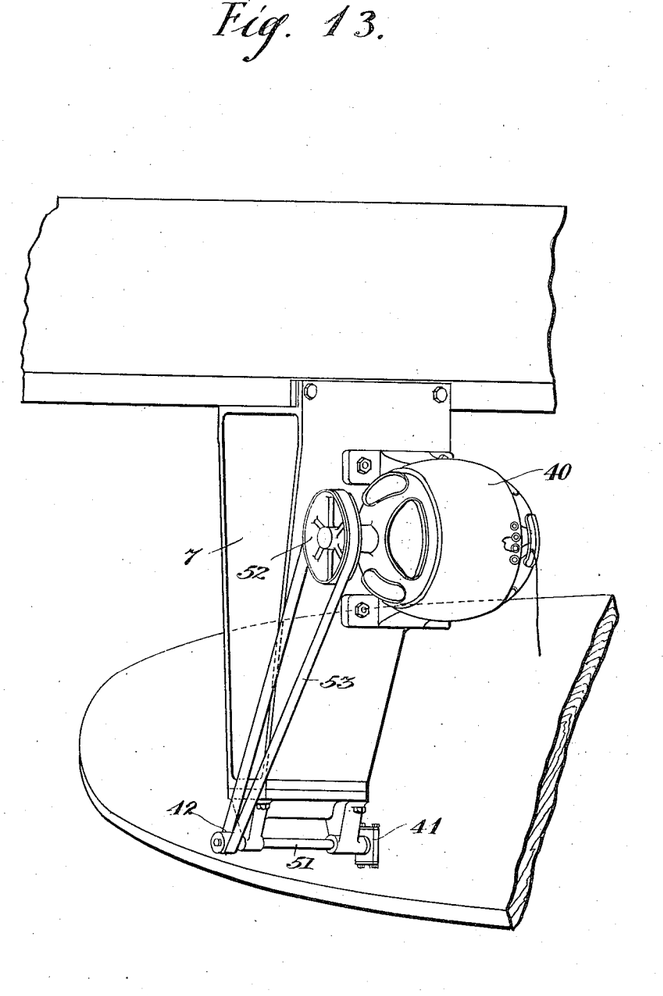
Fig. 13 is a perspective view of a machine, as applied for pattern manufacturing.

This invention is also applicable for the manufacture of wooden patterns for screw propellers. In Fig. 13 is shown a motor driven planer, in which the motor 40 is mounted upon the cutter holder 7, a suitable cutter being secured at one end of the cutter spindle, the other end of which is provided with a pulley 42 for driving the same, from the pulley 52 on motor 40 through belt 53.

I claim:—

1. In a propeller blade milling machine, the combination of a column, an arm movable longitudinally and circumferentially with respect to said column, means adapted to guide said arm in a predetermined path of movement longitudinally and circumferentially of said column, a bed disposed horizontally and at right angles to the axis of the path of movement of said arm, a rest movable longitudinally upon said bed, two upright arms carried by said rest, said arms being spaced apart from each other and having coacting concave faces to form guide ways longitudinally thereof, a drum-like member oscillatable and longitudinally movable in said guide ways, and an arm operatively connected with said first mentioned arm and extending diametrically through said drum-like member, but movable in said drum-like member, substantially as and for the purpose set forth.

2. In a propeller blade milling machine, the combination of a column, an arm adapted to carry a tool, movable longitudinally and circumferentially with respect to said column, means adapted to guide said arm in a predetermined path of movement longitudinally and circumferentially of said column, a bed disposed horizontally and at right angles to the axis of movement of said arm, a rest movable longitudinally upon said bed, means providing oppositely disposed upright coacting concave guide ways, carried by said rest, a drum like member oscillatable and longitudinally movable in said guide ways, an arm operatively connected with said first mentioned arm and extending diametrically through said drum like member but movable longitudinally with respect thereto, and means for actuating said rest longitudinally of said bed in either direction, substantially as and for the purpose set forth.

3. In a propeller blade milling machine, the combination of a column, an arm adapted to carry a tool movable longitudinally and circumferentially with respect to said column, means adapted to guide said arm in a predetermined path of movement longitudinally and circumferentially of said column, a bed disposed horizontally and at right angles to the axis of movement of said arm, a rest movable longitudinally upon said bed, means providing oppositely disposed upright coacting concave guide ways, carried by said rest, a drum like member oscillatable and longitudinally movable in said guide ways, and an arm operatively connected with said first mentioned arm and extending diametrically through said drum like member but movable longitudinally with respect thereto, substantially as and for the purpose set forth.

4. In a propeller blade milling machine, the combination of a column, an arm adapted to carry a tool movable longitudinally and circumferentially with respect to said column, means adapted to guide said arm in a predetermined path of movement longitudinally and circumferentially of said column, a bed, a rest movable longitudinally upon said bed, and means operatively connecting said arm with said rest whereby movement of the latter imparts circumferential and longitudinal movement to the former with respect to said column, substantially as and for the purpose set forth.

5. In a propeller blade milling machine, the combination with a tool holder and mechanism for imparting movement to said holder in a helical path about an axis common to the axes of said holder and the piece to be worked, of a cutter carrying element carried by said tool holder and means for adjusting the position of said cutter carrying element with respect to said holder in an axial direction parallel to the said axis about which the latter moves, substantially as and for the purpose set forth.

6. In a propeller blade milling machine, the combination with a tool holder and mechanism for imparting movement to said holder in a helical path about an axis common to the axes of said holder and the piece to be worked, of a cutter carrying element carried by said tool holder, and means for adjusting the position of said cutter carrying element circumferentially about the axis of said tool holder, substantially as and for the purpose set forth.

7. In a propeller blade milling machine, the combination with a tool holder and mechanism for imparting movement to said holder in a vertical path about an axis common to the axes of said holder and the piece to be worked, of a cutter carrying element carried by said tool holder, means for adjusting the position of said cutter carrying element with respect to said holder, in an axial direction parallel to the said axis about which the latter moves, and means for adjusting the position of said cutter carrying element circumferentially about said axis of adjustment of said first mentioned means, substantially as and for the purpose set forth.

8. In a propeller blade milling machine, the combination with a tool holder and mechanism for imparting movement to said holder in a helical path about an axis common to the axes of said holder and the piece to be worked, of a cutter carrying element carried by said tool holder, a wedge shaped member interposed between said holder and cutter carrying element, and means for actuating said wedge shaped member to adjust the position of said cutter carrying element with respect to said holder in an axial direction parallel to the said axis about which the latter moves, substantially as and for the purpose set forth.

9. In a propeller blade milling machine, the combination with a tool holder and mechanism for imparting movement to said holder in a helical path about an axis common to the axes of said holder and the piece to be worked, of a cutter carrying element carried by said tool holder, means for adjusting the position of said cutter carrying element with respect to said holder in an axial direction parallel to the said axis about which the latter moves, a segmental rack carried by said cutter carrying element, and a worm for coaction therewith, carried by said tool holder for adjusting the position of said cutter carrying element circumferentially about the said axis of adjustment of said first mentioned means, substantially as and for the purpose set forth.

10. In a propeller blade milling machine, the combination with a tool holder and mechanism for imparting movement to said holder in a helical path about an axis common to the axes of said holder and the piece to be worked, of a cutter carrying element carried by said tool holder, a segmental rack carried by said cutter carrying element, and a worm for coacting therewith carried by said tool holder for adjusting the position of said cutter carrying element circumferentially about the axis of said holder, substantially as and for the purpose set forth.

11. In a propeller blade milling machine, the combination with an elongated tool holder and mechanism for imparting movement to said holder in a helical path about an axis common to the axes of said holder and the piece to be worked, of a cutter carrying element carried by said tool holder, a bearing block carried by said tool holder, a two part shaft extending longitudinally of said tool holder, a coupler joining said two part shaft to permit longitudinal movement of one with respect to the other, but transmitting circumferential movement of one to the other, a spindle carried by said bearing block disposed transversely with respect to said two part shaft, a cutter carried by said spindle, means for transmitting movement of said shaft to said spindle, and means for adjusting the position of said bearing block with respect to said holder in an axial direction parallel to the said axis about which the latter moves, substantially as and for the purpose set forth.

12. In a propeller blade milling machine, the combination with an elongated tool holder and mechanism for imparting movement to said holder in a helical path about an axis common to the axes of said holder and the piece to be worked, of a bearing block carried by said tool holder, a two part shaft extending longitudinally of said tool holder, a coupler joining said two part shaft to permit longitudinal movement of one part with respect to the other, but transmitting circumferential movement from one to the other, a spindle carried by said bearing block disposed transversely with respect to said two part shaft, a cutter carried by said spindle, means for transmitting movement of said shaft to said spindle, and means for adjusting the position of said bearing block circumferentially about the axis of said shaft, substantially as and for the purpose set forth.

13. In a propeller blade milling machine, the combination of a tool carrier longitudinally and circumferentially movable about an axis common to the axes of said holder and the piece to be worked, a cam track, and means operatively connected with said tool carrier and working upon said cam track to guide said tool carrier in a predetermined path of movement with respect to the said axis, said means being adjustable to alter the relative position of said tool carrier with respect to said cam track at any position of said means with respect to said cam track, substantially as and for the purpose set forth.

14. In a propeller blade milling machine, the combination of a tool carrier longitudinally and circumferentially movable about an axis common to the axes of said holder and the piece to be worked, a cam track, a leg operatively connected to said tool carrier to transmit movement thereto, and a wedge shaped shoe carried by said leg and movable with respect thereto, and in contact with the tread of said cam track, to adjust the position of said tool carrier with respect to said cam track, the latter being adapted to guide said tool carrier in a predetermined path of movement about said axis, substantially as and for the purpose set forth.

15. A propeller blade milling machine comprising in combination, a hollow column, a sleeve carried by said column, a tool carrier movable longitudinally of said sleeve but circumferentially movable with respect to the said column, a rotatable cutter carried by said tool carrier, a shaft extending through said column concentric thereto, a second shaft exteriorly of said sleeve and carried thereby, with its axis parallel to the axis of said column, means for imparting movement of said first mentioned shaft to said second mentioned shaft, and mechanism for imparting movement of said second mentioned shaft to said rotatable cutter, but permitting movement of said tool carrier in a path of movement longitudinally of said sleeve, substantially as and for the purpose set forth.

In testimony whereof I affix my signature in presence of two witnesses.

KUMEZO ITO.

Witnesses:
GEUJI KUSIBARA,
HARUTADA YAKMARA.